United States Patent
Rangarajan et al.

(10) Patent No.: US 9,857,809 B2
(45) Date of Patent: Jan. 2, 2018

(54) FUZZY LOGIC CONTROL OF THERMOELECTRIC COOLING IN A PROCESSOR

(71) Applicant: Intel Corporation, Santa Clara, CA (US)

(72) Inventors: Thanunathan Rangarajan, Bangalore (IN); Rahul Khanna, Portland, OR (US); Rafael De La Guardia Gonzalez, Guadalajara (MX); Minh T. Le, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 14/548,361

(22) Filed: Nov. 20, 2014

(65) Prior Publication Data

US 2015/0185741 A1 Jul. 2, 2015

(30) Foreign Application Priority Data

Dec. 30, 2013 (IN) ............... 6174/CHE/2013

(51) Int. Cl.
*G05D 23/19* (2006.01)
*G06N 5/04* (2006.01)
(Continued)

(52) U.S. Cl.
CPC ......... *G05D 23/19* (2013.01); *G05B 13/0275* (2013.01); *G05B 15/02* (2013.01);
(Continued)

(58) Field of Classification Search
CPC ........ G05D 23/19; G06F 1/206; G05B 15/02; G05B 13/0275; G05B 2219/49216; G06N 5/048
See application file for complete search history.

(56) References Cited

U.S. PATENT DOCUMENTS 6,431,127 B2 * 8/2002 Weber ............... F01P 7/04
123/41.12
6,735,499 B2 * 5/2004 Ohki ............... G06F 1/206
361/679.31

(Continued)

FOREIGN PATENT DOCUMENTS

TW 1267339 11/2006

OTHER PUBLICATIONS

EP Search Report issued in corresponding application EP14194557.6 dated May 8, 2015, (10 pages).
Li et al., "Analysis and Control of Equivalent Physical Simulator for Nanosatellite Space Radiator," IEEE/ASME on Mechatronics, vol. 15, No. 1, Feb. 2010, pp. 79-87.

(Continued)

*Primary Examiner* — Charles Kasenge
(74) *Attorney, Agent, or Firm* — Trop, Pruner & Hu, P.C.

(57) ABSTRACT

In an embodiment, a processor includes a fuzzy thermoelectric cooling (TEC) controller to: obtain a current TEC level associated with the processor; obtain a current fan power level associated with the processor; fuzzify the current TEC level to obtain a first fuzzy fan level; fuzzify the current fan power level to obtain a second fuzzy fan level; determine a new TEC power level based at least in part on the first fuzzy fan level, the second fuzzy fan level, and a plurality of fuzzy rules; and provide the new TEC power level to a TEC device associated with the processor, where the TEC device is to transfer heat from the processor to a heat sink. Other embodiments are described and claimed.

19 Claims, 10 Drawing Sheets

(51) Int. Cl.
*G05B 15/02* (2006.01)
*G05B 13/02* (2006.01)
*G06F 1/20* (2006.01)

(52) U.S. Cl.
CPC ............. *G06F 1/206* (2013.01); *G06N 5/048* (2013.01); *G05B 2219/49216* (2013.01)

(56) References Cited

U.S. PATENT DOCUMENTS

| | | | | |
|---|---|---|---|---|
| 6,967,842 | B2* | 11/2005 | Aoki | H05K 7/20727 165/104.22 |
| 7,711,659 | B2* | 5/2010 | de la Guardia | G06F 1/206 706/1 |
| 2004/0250992 | A1* | 12/2004 | Aoki | H05K 7/20727 165/80.3 |
| 2005/0078451 | A1 | 4/2005 | Saucine et al. | |
| 2008/0162388 | A1* | 7/2008 | de la Guardia | G06F 1/206 706/14 |
| 2009/0021908 | A1* | 1/2009 | Patel | G06F 1/20 361/688 |
| 2011/0055597 | A1 | 3/2011 | Wyatt | |

OTHER PUBLICATIONS

Aly et al., "Fuzzy Temperature Control of a Thermoelectric Cooler," Industrial Technology, 2006, ICIT 2006, IEEE International Conference on Dec. 15-17, 2006, pp. 1580-1585.

TW Search Report issued in corresponding application TW103141424 dated Aug. 27, 2015 (8 pages).

\* cited by examiner

FUZZY LOGIC CONTROL OF THERMOELECTRIC COOLING IN A PROCESSOR

TECHNICAL FIELD

Embodiments relate generally to cooling of electronic devices.

BACKGROUND

Conventionally, a computing device may include a cooling system to remove excess heat produced by electronic components. For example, the cooling system may include a fan to create air flows through the computing device. Such air flows may be used to cool components such as processors, power supplies, memory devices, etc.

DETAILED DESCRIPTION

Figure 1A:
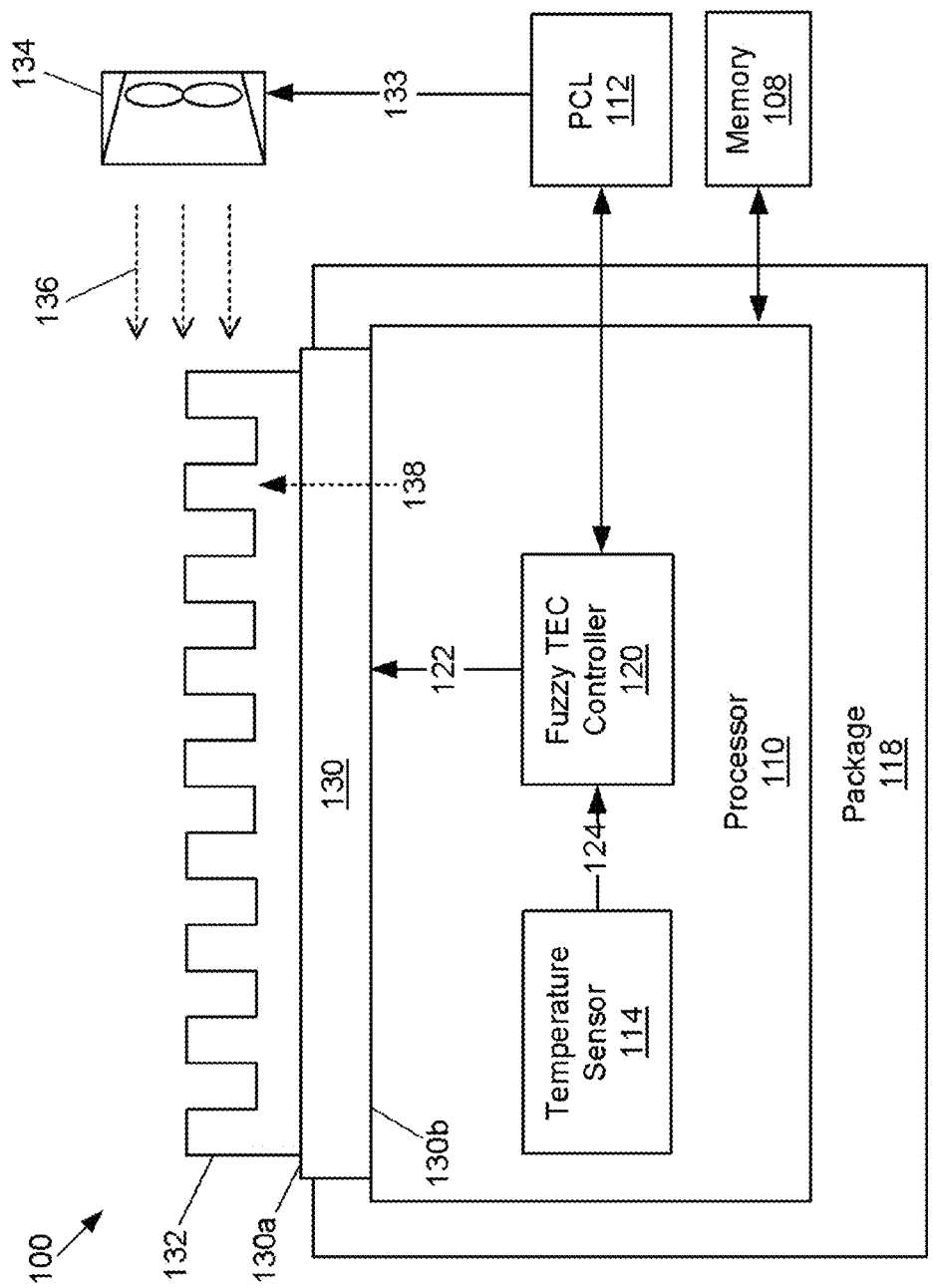
FIGS. 1A-1B are block diagrams in accordance with one or more embodiments.

Some computers may include thermoelectric cooling (TEC) devices to remove heat generated by internal components. Such TEC devices may include semiconductor materials which provide a temperature differential when receiving electric power. This temperature differential may increase heat flow from an internal component to a platform cooling device (e.g., air cooling, liquid cooling, etc.). However, in conventional systems, TEC devices and/or platform cooling devices may not be controlled in an efficient manner.

In accordance with some embodiments, a processor may include fuzzy TEC logic to control a cooling system including a TEC device. The fuzzy TEC logic may include functionality to fuzzify parameters related to the cooling system, including current power levels of the TEC device and the platform cooling device. Further, the fuzzy TEC logic may perform a fuzzy inference to determine new power levels for the TEC device and the platform cooling device. As such, embodiments may provide improved levels of overall cooling efficiency.

Although the following embodiments may be described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Note that embodiments described herein may be independent of and/or complementary to an operating system (OS)-based mechanism, such as the Advanced Configuration and Power Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Referring to FIG. 1A, shown is a block diagram of a system 100 in accordance with one or more embodiments. In some embodiments, the system 100 may be all or a portion of an electronic device or component. For example, the system 100 may be included in a cellular telephone, a computer, a server, a network device, a controller, an appliance, a computing blade, a blade enclosure, etc.

As shown in FIG. 1A, in some embodiments, the system 100 may include a processor 110, memory 108, a fan 134, platform cooling logic (PCL) 112, a heat sink 132, and a thermoelectric cooling (TEC) device 130. In one or more embodiments, the processor 110 may include a temperature sensor 114 and a fuzzy TEC controller 120. Further, the processor 110 may be coupled to the memory 108. The memory 108 may be any type of computer memory (e.g., dynamic random access memory (DRAM), static random-access memory (SRAM), non-volatile memory, etc.). In some embodiments, the processor 110 may be mounted on or within a package 118.

In one or more embodiments, the heat sink 132 may be a finned heat exchanger. As shown, the heat sink 132 may be convectively cooled by an air flow 136 provided by the fan 134. Further, in some embodiments, the PCL 112 may control the fan level 133 to vary the amount of convective cooling provided by the air flow 136. For example, the PCL 112 may set the fan level 133 to increase the speed of the fan 134, and therefore increase the convective cooling associated with the air flow 136. The fan level 133 may be, e.g., a power input level, a pulse width modulated (PWM) signal, an indication or command for a particular fan speed, a voltage level, etc.). In some embodiments, each setting of the fan level 133 may correspond to a particular PWM duty cycle and an associated power cost.

In some embodiments, the TEC device 130 may include a first surface 130a in physical contact with the heat sink 132, and a second surface 130b in physical contact with the processor 110. In some embodiments, the TEC device 130 may receive a TEC power input 122 from the fuzzy TEC controller 120. Further, when receiving the TEC power input 122, the TEC device 130 may provide a temperature differential between the first surface 130a and the second surface 130b. For example, in some embodiments, the TEC device 130 may decrease the temperature on the first surface 130a, and/or may increase the temperature on the second surface 130b. As such, the TEC device 130 may increase a heat flow 138 from the processor 110 to the heat sink 132.

In some embodiments, the fuzzy TEC controller 120 may control a level of the TEC power input 122 to vary the heat flow 138 provided by the TEC device 130. For example, increasing the TEC level (i.e., the level of the TEC power input 122) may increase the heat flow 138 from the processor 110 to the heat sink 132. In another example, decreasing the TEC level may decrease the heat flow 138. In some embodiments, each setting of the TEC level may correspond to a particular PWM duty cycle and an associated power cost.

In one or more embodiments, the fuzzy TEC controller 120 may determine the TEC level based at least in part on a temperature value 124 for all or a portion of the processor 110. Further, in some embodiments, this temperature value 124 may be obtained from a temperature sensor 114 included within (or in proximity to) the processor 110.

In some embodiments, the fuzzy TEC controller 120 may interact and/or coordinate with the PCL 112. For example, the fuzzy TEC controller 120 may obtain the fan level from the PCL 112, and may determine the TEC level based at least in part on the fan level. Further, the fuzzy TEC controller 120 may coordinate with the PCL 112 to control or set the fan level. In one or more embodiments, the fuzzy TEC controller 120 may determine the TEC level and/or the fan level using fuzzy logic functionality. The functionality of the fuzzy TEC controller 120 is described further below with reference to FIGS. 1B and 2A-2B.

In some embodiments, the fan 134 may be a platform cooling device, meaning a cooling device included in and/or managed by a computing platform. For example, the fan 134 may be included in a computer enclosure, a motherboard, a server cabinet, a blade enclosure, a heat sink, etc. In another example, the fan 134 may be a dedicated fan managed by the PCL 112. As used herein, the term "platform cooling level" may refer generally to a fan level, and/or to any level or setting for a platform cooling device.

Note that, while FIG. 1A depicts the system 100 as including the fan 134, embodiments are not limited in this regard. In particular, it is contemplated that some embodiments may use other types of platform cooling devices instead of (or in combination with) the fan 134. For example, in some embodiments, a liquid cooling system may be used to cool the TEC device 130 or the heat sink 132.

Figure 1B:
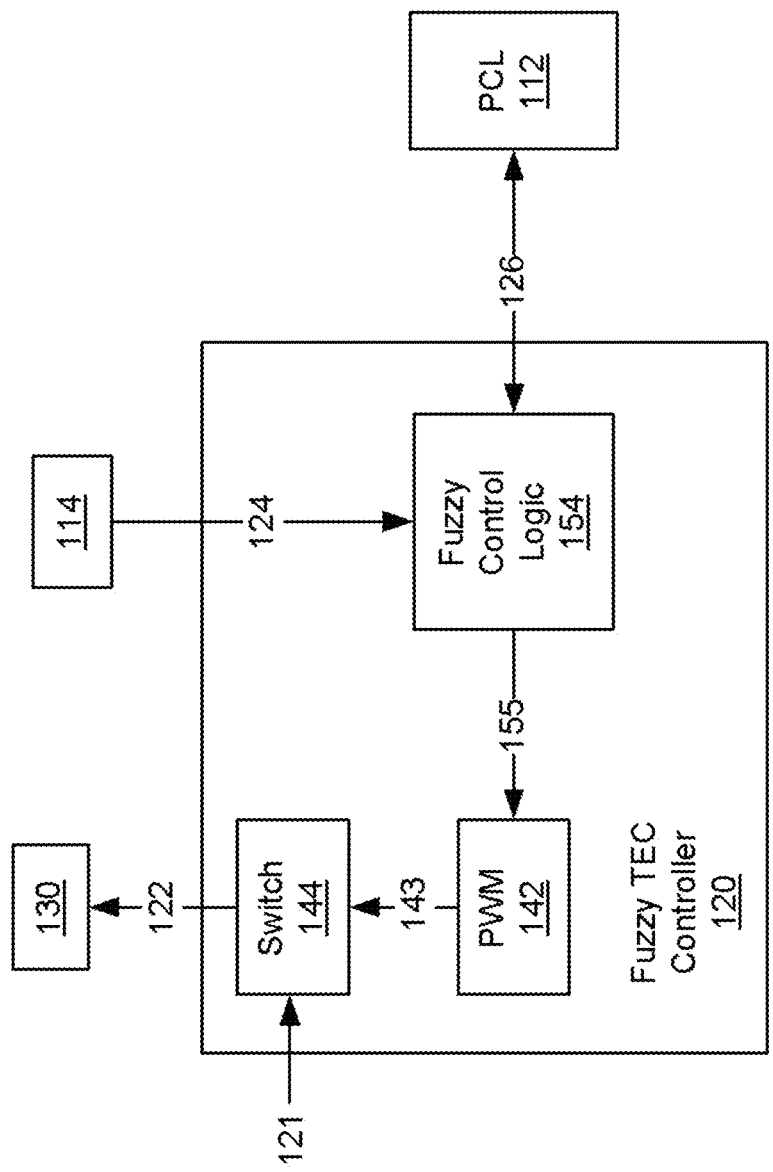

Referring now to FIG. 1B, shown is an example embodiment of a fuzzy TEC controller 120. In this embodiment, the fuzzy TEC controller 120 may include various components, including a switch 144, a pulse width modulation (PWM) unit 142, and fuzzy control logic 154.

In one or more embodiments, the fuzzy control logic 154 may include functionality to control operation of the TEC device 130 using fuzzy logic. For example, the fuzzy control logic 154 may determine a new TEC level, and may provide an indication 155 of the new TEC level to the PWM unit 142.

In some embodiments, the fuzzy control logic 154 may determine the new TEC level based on the current state of the processor 110 and/or associated cooling systems. For example, in some embodiments, the fuzzy control logic 154 may obtain the current fan power level 126 from the PCL 112, and/or may obtain the temperature value 124 from the temperature sensor 114. In addition, the fuzzy control logic 154 may obtain any other parameters related to system cooling (e.g., the current TEC power level, a current state of the PCL 112, operating systems commands, etc.). In some embodiments, the fuzzy control logic 154 may also determine a new fan level. The fuzzy control logic 154 may also interact with or control the PCL 112 to set the new fan level.

In some embodiments, the fuzzy control logic 154 may be triggered periodically (e.g., according to a specified period). Alternatively, the fuzzy control logic 154 may be triggered by internal or external signals, by processor or platform events, etc. The functionality of the fuzzy control logic 154 is described further below with reference to FIGS. 2A-2B.

In one or more embodiments, the PWM unit 142 may receive the indication 155 of the new TEC level, and may generate a duty cycle signal 143 (e.g., a given number of pulses per time unit) based on the new TEC level. As shown, the duty cycle signal 143 may be provided to the switch 144. In some embodiments, the switch 144 may switch a power input 121 on and off based on the duty cycle signal 143, and may output a pulsed power supply 122. In one or more embodiments, the pulsed power supply 122 may power the TEC device 130 at the new TEC level.

Figure 2A:
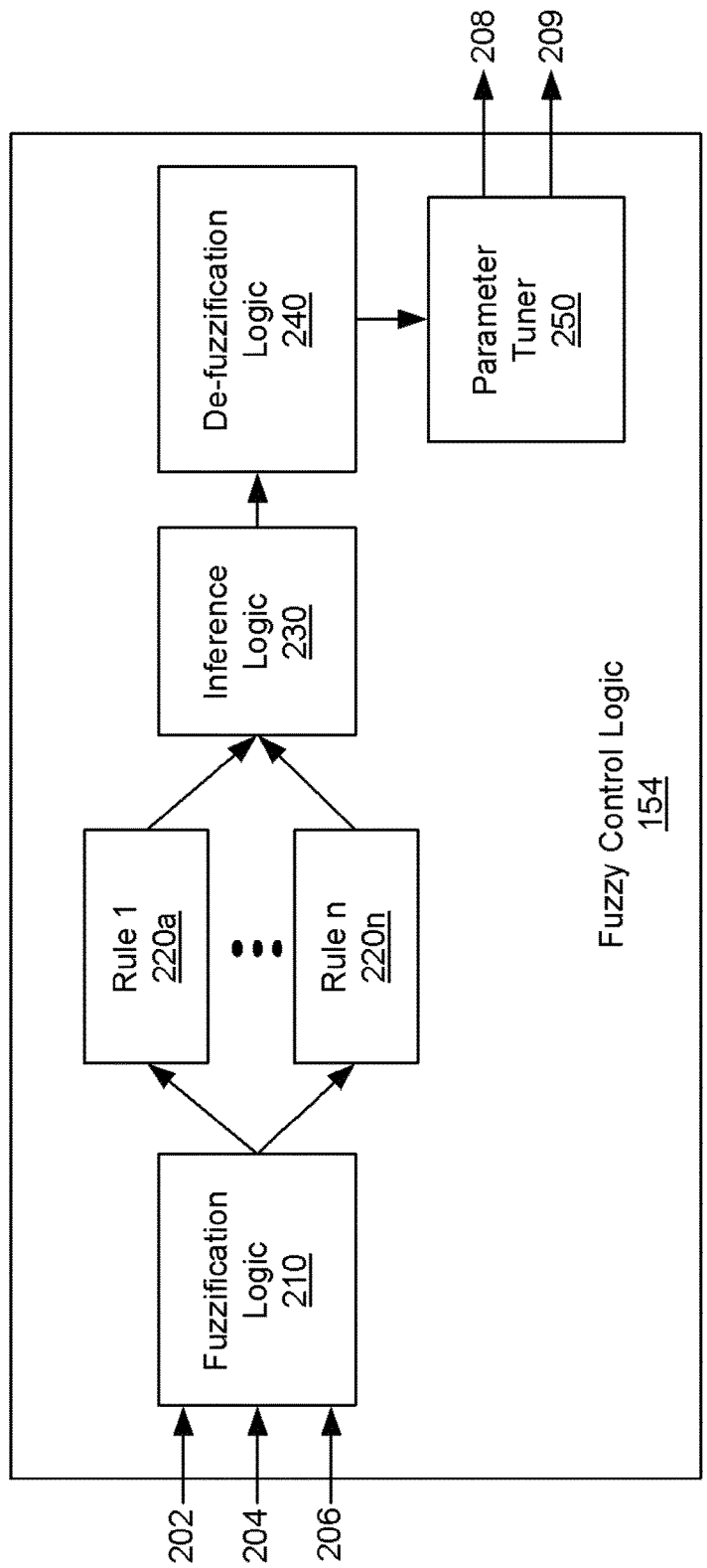
FIGS. 2A-2B are block diagrams in accordance with one or more embodiments.

Referring now to FIG. 2A, shown is an example embodiment of the fuzzy control logic 154. In this embodiment, the fuzzy TEC controller 120 may include various components, including fuzzification logic 210, fuzzy rules 220, inference logic 230, de-fuzzification logic 240, and a parameter tuner 250.

In one or more embodiments, the fuzzification logic 210 may receive one or more input values. For example, such input values may include a current fan level 202, a current TEC level 204, and/or a current temperature value 206. In some embodiments, such inputs may be "crisp" or quantified values (e.g., a fan level expressed as a number of pulses per time unit, a TEC level expressed as a number of pulses per time unit, a temperature value expressed as a number of degrees Celsius, etc.).

Figure 2B:
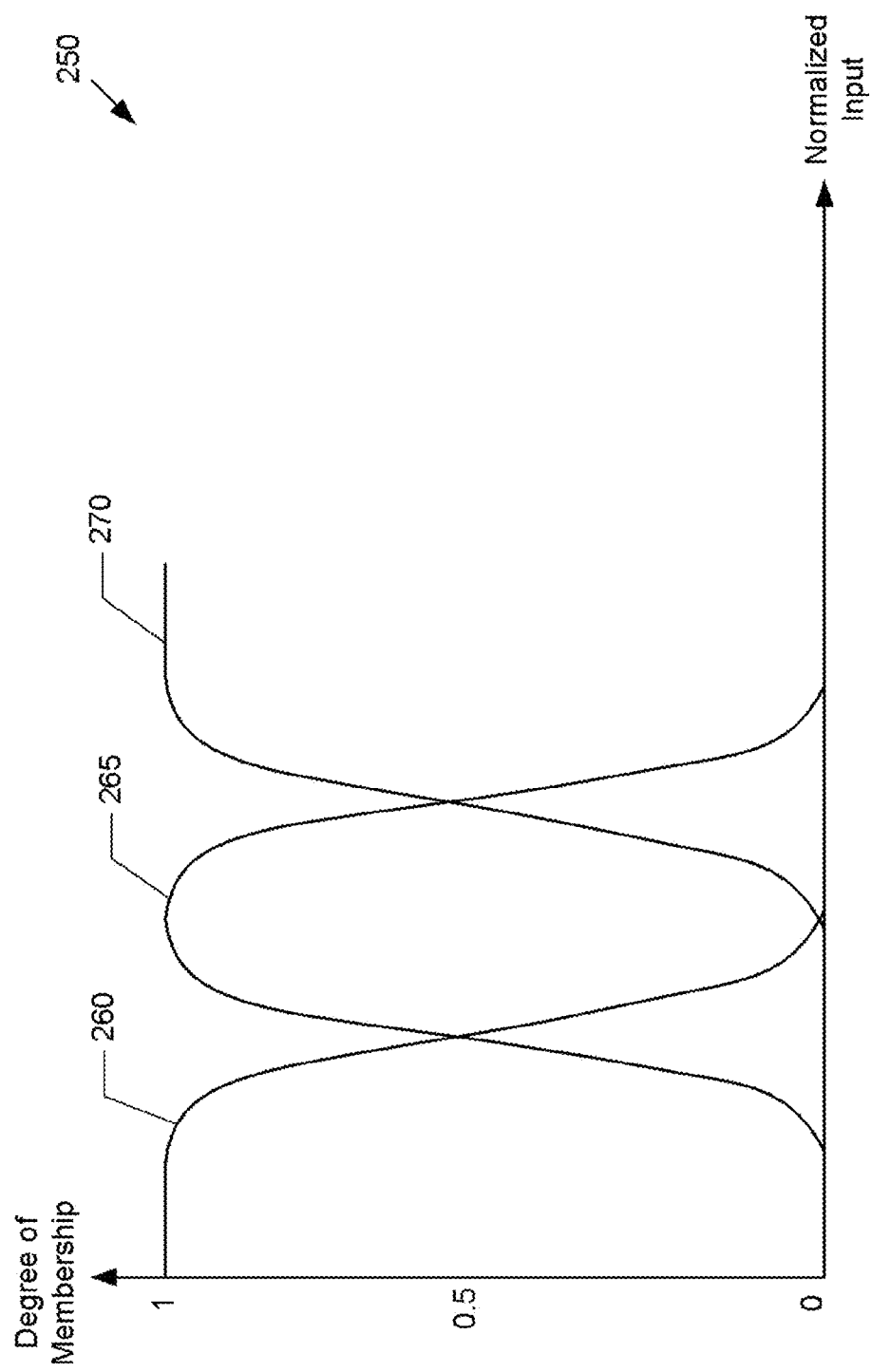

In some embodiments, the fuzzification logic 210 may include functionality to "fuzzify" the input values, meaning to convert from a crisp value to a fuzzy value. Referring now to FIG. 2B, shown is an example graph 250 illustrating the functionality of the fuzzification logic 210. In particular, the graph 250 illustrates an example of membership functions that implement three non-numeric or linguistic values of a fan level. In this example, the first curve 260 may correspond to the fuzzy set "SLOW," the second curve 265 may correspond to the fuzzy set "MEDIUM," and the third curve 270 may correspond to the fuzzy set "FAST." These curves may used to determine the degree of membership of a given input in each fuzzy set.

Referring again to FIG. 2A, the fuzzification logic 210 may include functionality to map a current fan level 202 to defined fuzzy sets (e.g., curves 260, 265, 270 shown in FIG. 2B), and thereby obtain an abstracted fan level (referred to as a first "fuzzy fan level"). Further, the fuzzification logic 210 may include functionality to also map a current TEC level 204 to the defined fuzzy sets, and thereby obtain a second fuzzy fan level. Thus, by abstracting a TEC level as fuzzy fan level, the fuzzification logic 210 may enable any number of fan levels and TEC levels to be combined into a unified fuzzy control model.

In one or more embodiments, the fuzzification logic 210 may include a thermal model of the processor 110, the fan 134, and/or the TEC device 130. The processor 110 consumes power to perform computational work, and produces heat as a byproduct. Thus, whenever the processor 110 executes a workload, its temperature rises, and the fan 134 and the TEC device 130 cool the processor 110 to counterbalance this rise in temperature. In some embodiments, at any given instant of time, the temperature of the processor 110 may be modeled as a cumulative average of past and current workload, and a regression of past and current cooling delivered by the fans and TEC devices together.

In some embodiments, the thermal model included in the fuzzification logic 210 may predict the temperature based on the current power and temperature, fuzzy rules applied for the current fan PWM and TEC input duty cycles, and/or the predicted temperature at next sampling instant based on the current power. For example, the thermal model included in the fuzzification logic 210 may be based on a Resistance Capacitor (RC) network model.

In one or more embodiments, the fuzzification logic 210 may provide one or more fuzzy fan values to the fuzzy rules 220. In some embodiments, each fuzzy rule 220 may have the general form IF antecedent THEN consequent. For instance, assume the variable z represents a fuzzy fan value, and the variable y represents a temperature value. In some embodiments, each rule may produce a temperature y that is influenced by the membership function M of each fuzzy fan value z. Thus, the fuzzy rules 220 may be illustrated by the following example rules.

Rule 1: If $z_1$="SLOW" and $z_2$="SLOW" then $y_1$=40 degrees

Rule 2: If $z_1$="SLOW" and $z_2$="MEDIUM" then $y_2$=45 degrees

Rule 3: If $z_1$="MEDIUM" and $z_2$="SLOW" then $y_3$=47 degrees

In one or more embodiments, the results of the fuzzy rules 220 may be provided to the inference logic 230. The inference logic 230 may include functionality to derive a fuzzy inference based on a weighted combination of the outputs from each fuzzy rule 220. For example, assume that the fuzzy rules 220 include n rules, each associated with a normalized weight factor w. Each normalized weight factor $w_i$ may correspond to the relative contribution of the rule i to a fuzzy inference. Thus, the fuzzy inference f(Z) for a net estimated temperature may have the following form:

$$f(Z)=w_1y_1+w_2y_2+w_3y_3+\ldots+w_ny_n$$

In one or more embodiments, assuming n fuzzy rules, the normalized weight factor $w_j$ may be computed using the following formula:

$$w_j=M_j/(M_1+M_2+\ldots+M_n)$$

Here, $M_j$ is the degree of membership or membership function for the fuzzy input j. For example, assume that, for a fuzzy fan value z=0.3, the "SLOW" membership function $M_1$ is 0.63, the "MEDIUM" membership function $M_2$ is 0.31, and the "FAST" membership function $M_3$ is 0.0. Thus, in this example, the corresponding weight factors may be $w_1$=0.63, $w_2$=0.31, and $w_3$=0.0.

In one or more embodiments, the temperature y may be obtained using a parameter adaptation algorithm (PAA) method. The PAA method may assume that the die temperature at a given sampling instant t is proportional to the current power consumption of the die, plus the power already consumed till the instant t. Further, the PAA method may assume that power consumption in the processor die is dissipated as heat. In addition, the PAA method may assume that the die temperature at the instant t is regressively reduced through the cooling action of the fan and the TEC device. In some embodiments, the instantaneous die temperature may be dependent on the amount of computing work performed by the processor, and the cumulative cooling received by the processor until instant t. For a given rule, the temperature y at an instant (t+1) may be expressed as follows:

$$y(t+1)=aP(t)+bT(t)$$

Here, P(t) is the instantaneous power consumed by the die at time instant t. Further, T(t) is the accumulated balance temperature remaining in the die at time instant t. The parameters a and b can be obtained using the PAA method, for example through a dummy workload applied in a controlled laboratory environment, or by measuring the active workload running on the die in the field. Once the parameters a and b are determined, it is possible to predict future die temperatures by observing the current power consumed, the current die temperature, and recording the current output of the fuzzy rules based on the parameters a and b.

In some embodiments, the de-fuzzification logic 240 may include functionality to de-fuzzify the output of the inference logic 230. For example, the de-fuzzification logic 240 may convert a fuzzy value provided by the inference logic 230 to a crisp value (e.g., a net estimated temperature measured in degrees Celsius).

In one or more embodiments, the parameter tuner 250 may include functionality to evaluate a cost factor associated with each fuzzy rule 220. In some embodiments, the cost factor for each fuzzy rule may be based on the power consumption associated with a cooling system. For example, referring to FIG. 1A, the cost factor for a given fuzzy rule may be based on the amount of cumulative power consumed by the fan 134 and the TEC device 130 when operated at levels associated with that fuzzy rule. Further, the cost factor may also include the amount of power associated with heat leakage in the TEC device. For example, the cost factor C for fuzzy rule R may be represented by the following formula:

$$C(z_1, z_2|R)=P_F(z_1)+P_T(z_2)+P_L(y_1)$$

In the above formula for cost factor C, the term $P_F(z_1)$ represents the power consumed by a fan, $P_T(z_2)$ represents the power consumed by a TEC device, and $P_L(y_1)$ represents the power associated with heat leakage in the TEC device. In some embodiments, the fan power $P_F$ may be determined using the Fan Power law that relates the fan rotation speed r to its power consumption. For example, the fan power $P_F$ may be determined using the following formula:

$$P_F=(r)^3$$

In some embodiments, the TEC power $P_T$ may be determined using the coefficient of performance (CoP) of the TEC device. For example, the TEC power $P_T$ may be determined using the following formula:

$$P_T = Q_c/\text{CoP}$$

In the above formula for TEC power $P_T$, the term $Q_c$ is the rate of heat generated (e.g., by the processor 110). In some embodiments, the rate of heat $Q_c$ may depend on the computing workload of the processor 110. Further, the rate of heat $Q_c$ may be expressed by the following formula:

$$Q_c = I*S*T_c - K(T_h - T_c) - (R*I^2)/2$$

In the above formula for the rate of heat $Q_c$, I is the current input to the TEC device, S is the Seebeck constant, K is the conductance of the TEC device, R is the resistance of the TEC device, $T_h$ is the temperature at the hot side of the TEC device, and $T_c$ is the temperature at the cold side of the TEC device. The first term in this equation represents the Peltier cooling action of the TEC device 130, the second term represents the heat leakage from the hot side to the cold side of the TEC device, and the third term represents the Joule effect.

In some embodiments, the heat leakage power $P_L$ from the hot side to the cold side of the TEC device may be determined using the second term of the formula for the rate of heat $Q_c$. For example, the heat leakage power $P_L$ may be determined using the following formula:

$$P_L = K(T_h - T_c)$$

In one or more embodiments, the parameter tuner 250 may include functionality to determine a prediction error. In some embodiments, the prediction error may be based on a difference between the predicted temperature and the actual measured temperature.

In one or more embodiments, the parameter tuner 250 may include functionality to determine a new TEC power level 208 and/or a new fan level 209 based on outputs of the de-fuzzification logic 240. In some embodiments, this functionality may use a predictive control loop to minimize an objective function based on the cost factor and/or the prediction error. For example, the parameter tuner 250 may evaluate fuzzy inferences associated with various TEC power levels 208 and fan levels 209. The parameter tuner 250 may then select a particular combination of TEC power level 208 and fan level 209 based on minimizing the associated cost factor and/or prediction error. In some embodiments, the parameter tuner 250 may use any optimization technique, including linear programming, heuristics, multi-objective optimization, etc. In one or more embodiments, the new TEC power level 208 may be used to provide power to a TEC device (e.g., TEC device 130 shown in FIG. 1A). Further, the new fan level 209 may be used to provide power to a platform cooling device (e.g., fan 134 shown in FIG. 1A).

Figure 3:
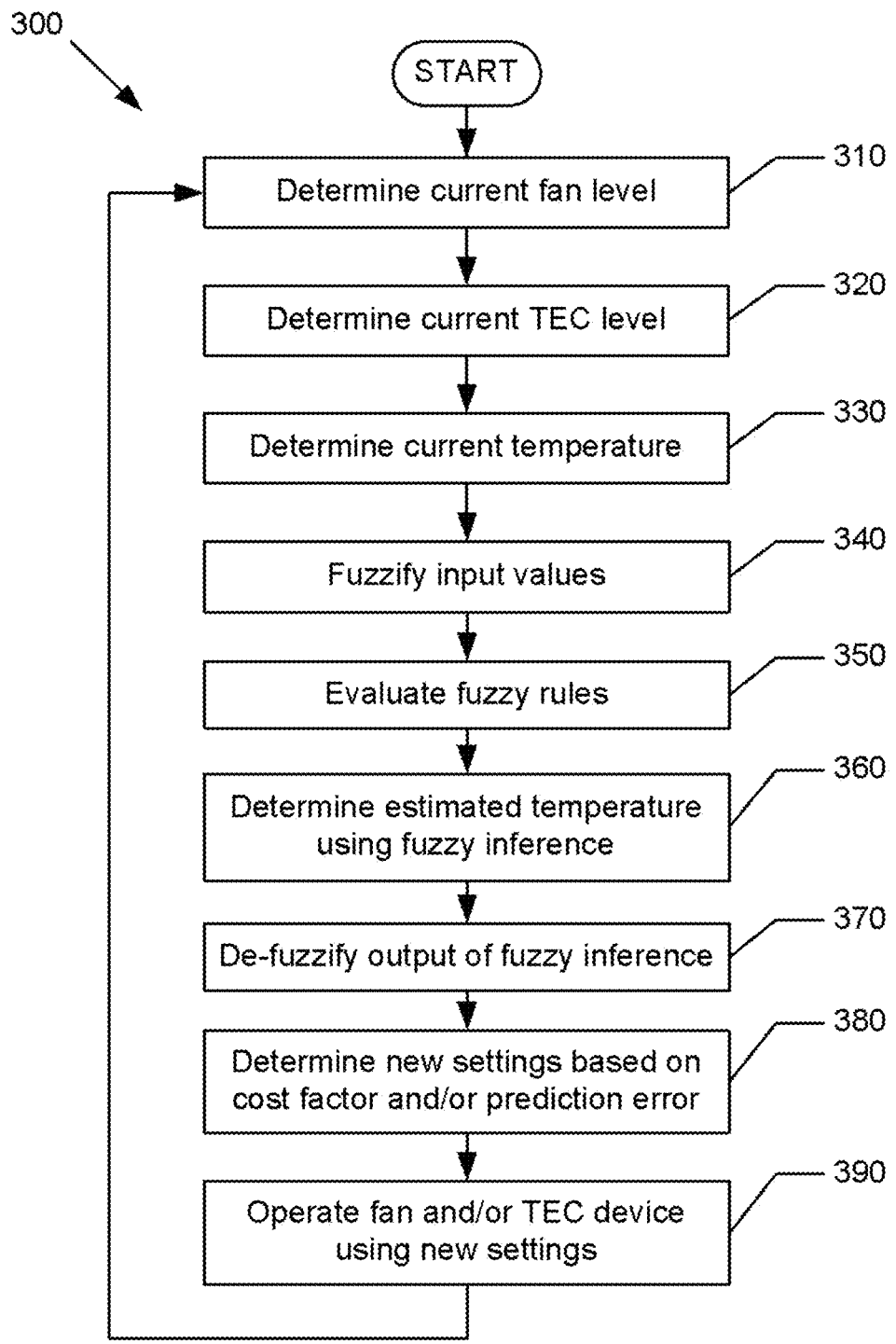
FIG. 3 is a sequence in accordance with one or more embodiments.

Referring now to FIG. 3, shown is a sequence 300 for controlling a cooling system, in accordance with one or more embodiments. In one or more embodiments, the sequence 300 may be part of the fuzzy TEC controller 120 shown in FIGS. 1A-1B. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, a current fan level may be determined. For example, referring to FIG. 1A, the fuzzy TEC controller 120 may determine the level of the fan level 133 provided to the fan 134. In some embodiments, the fuzzy TEC controller 120 may interact with the PCL 112 to determine the current fan level.

At step 320, a current TEC level may be determined. For example, referring to FIG. 1A, the fuzzy TEC controller 120 may determine the current level of the TEC device. In some embodiments, the fuzzy TEC controller 120 may store the current TEC level in a register, internal memory, etc.

At step 330, a current temperature may be determined. For example, referring to FIG. 1A, the fuzzy TEC controller 120 may read the temperature value 124 from the temperature sensor 114 included in the processor 110.

At step 340, input values may be fuzzified. For example, referring to FIG. 2A, the fuzzification logic 210 may fuzzify one or more of the current fan level 202, the current TEC level 204, and/or the current temperature value 206, thereby converting these inputs from crisp values to a fuzzy values. In some embodiments, the current TEC level 204 may be abstracted as a fuzzy fan level.

At step 350, fuzzy rules may be evaluated using the fuzzified inputs. For example, referring to FIG. 2A, the fuzzy rules 220 may be evaluate using the fuzzified values provided by the fuzzification logic 210.

At step 360, an estimated temperature may be estimated using fuzzy inference. For example, referring to FIG. 2A, the inference logic 230 may include functionality to derive a fuzzy inference based on a weighted combination of the outputs from each fuzzy rule 220. In some embodiments, each fuzzy rule 220 may be associated with a particular weight factor w.

At step 370, the output of the fuzzy inference may be de-fuzzified. For example, referring to FIG. 2A, the de-fuzzification logic 240 may de-fuzzify the estimated temperature provided by the inference logic 230.

At step 380, new settings may determined based on a cost factor and/or a prediction error. For example, referring to FIG. 2A, the parameter tuner 250 may select a new TEC level and/or new fan level based on minimizing a cost factor and/or a prediction error. In some embodiments, the cost factor associated with each fuzzy rule 220 may be based on the amount of cumulative power consumed by the fan 134 and the TEC device 130 when operated at levels associated with that fuzzy rule 220. Further, in some embodiments, the prediction error may be based on a difference between the predicted temperature and the actual measured temperature.

At step 390, the fan and/or the TEC device may be operated according to the new settings. For example, referring to FIG. 1B, the fuzzy TEC controller 120 may interact or set the PCL 112 to operate the fan 134 at the new fan level. In addition, the fuzzy TEC controller 120 may provide the pulsed power supply 122 to the TEC device 130 at the new TEC level. After step 390, the sequence 300 ends.

Note that the examples shown in FIGS. 1A-1B, 2A-2B, and 3 are provided for the sake of illustration, and are not intended to limit any embodiments. For instance, while embodiments are shown as including platform cooling systems based on fans (e.g., fan 134), other platform cooling systems may be used (e.g., a liquid cooling system). Further, it is contemplated that cooling systems may include any number or combination of fans and/or TEC devices. Furthermore, while FIG. 2B depicts particular examples of fuzzy sets, embodiments may include any type and/or number of fuzzy sets (e.g., low/high, very low, very high, etc.). In addition, while embodiments may be shown in simplified form for the sake of clarity, embodiments may include any number and/or arrangement of processors, cores, and/or additional components (e.g., buses, storage media, connectors, power components, buffers, interfaces, etc.). It is contemplated that specifics in the examples shown in FIGS. 1A-1B, 2A-2B, and 3 may be used anywhere in one or more embodiments.

Figure 4:
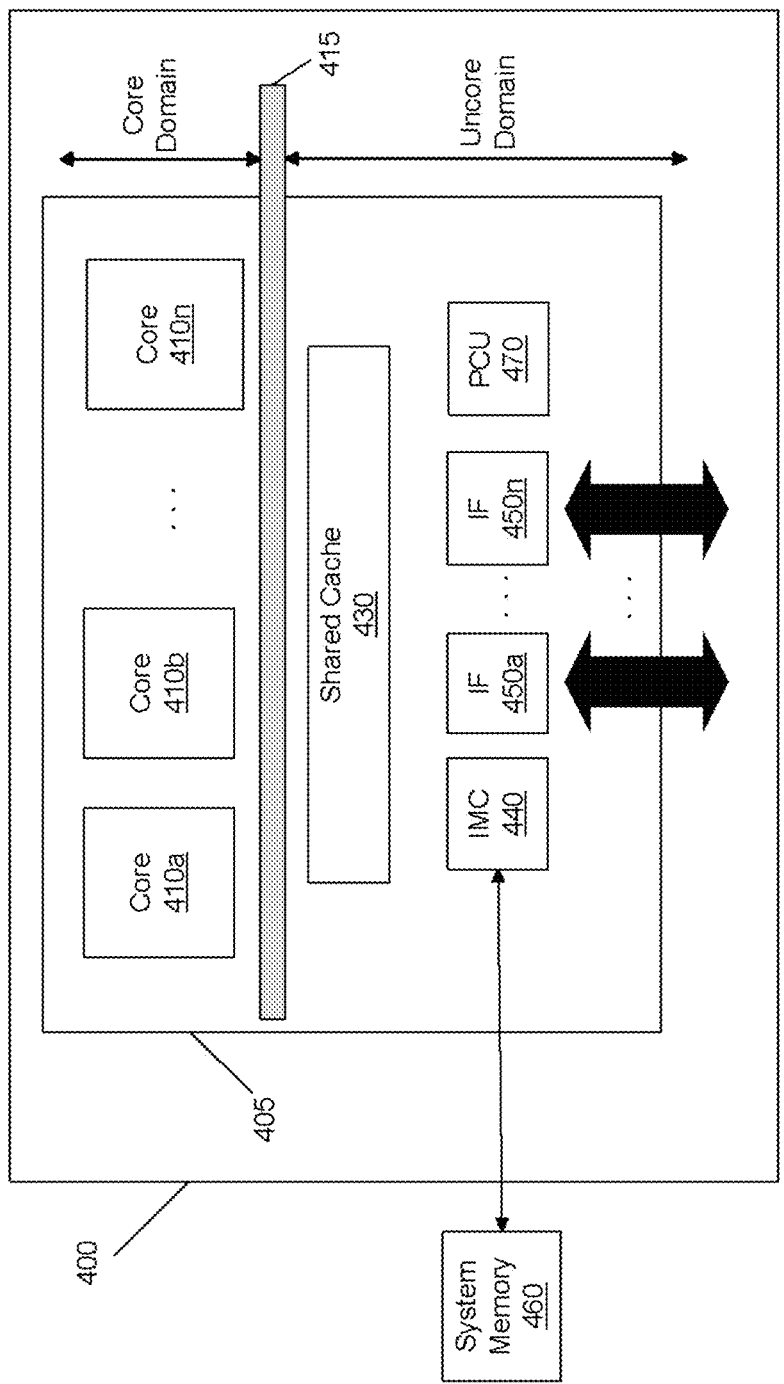
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain that includes various components. As seen, the uncore domain may include a shared cache 430. In addition, the uncore may include an integrated memory controller 440, a power control unit (PCU) 470, and various interfaces 450.

Although not shown for ease of illustration in FIG. 4, in some embodiments, the processor 400 may include some or all of the functionality of the fuzzy TEC controller 120 and/or the TEC device 130 described above with reference to FIGS. 1A-1B.

With further reference to FIG. 4, the processor 400 may communicate with a system memory 460, e.g., via a memory bus. In addition, by interfaces 450, connection can be made to another processor, or various off-package components such as peripheral devices, mass storage and so forth. While shown with this particular implementation in the embodiment of FIG. 4, the scope of the present invention is not limited in this regard.

Figure 5:
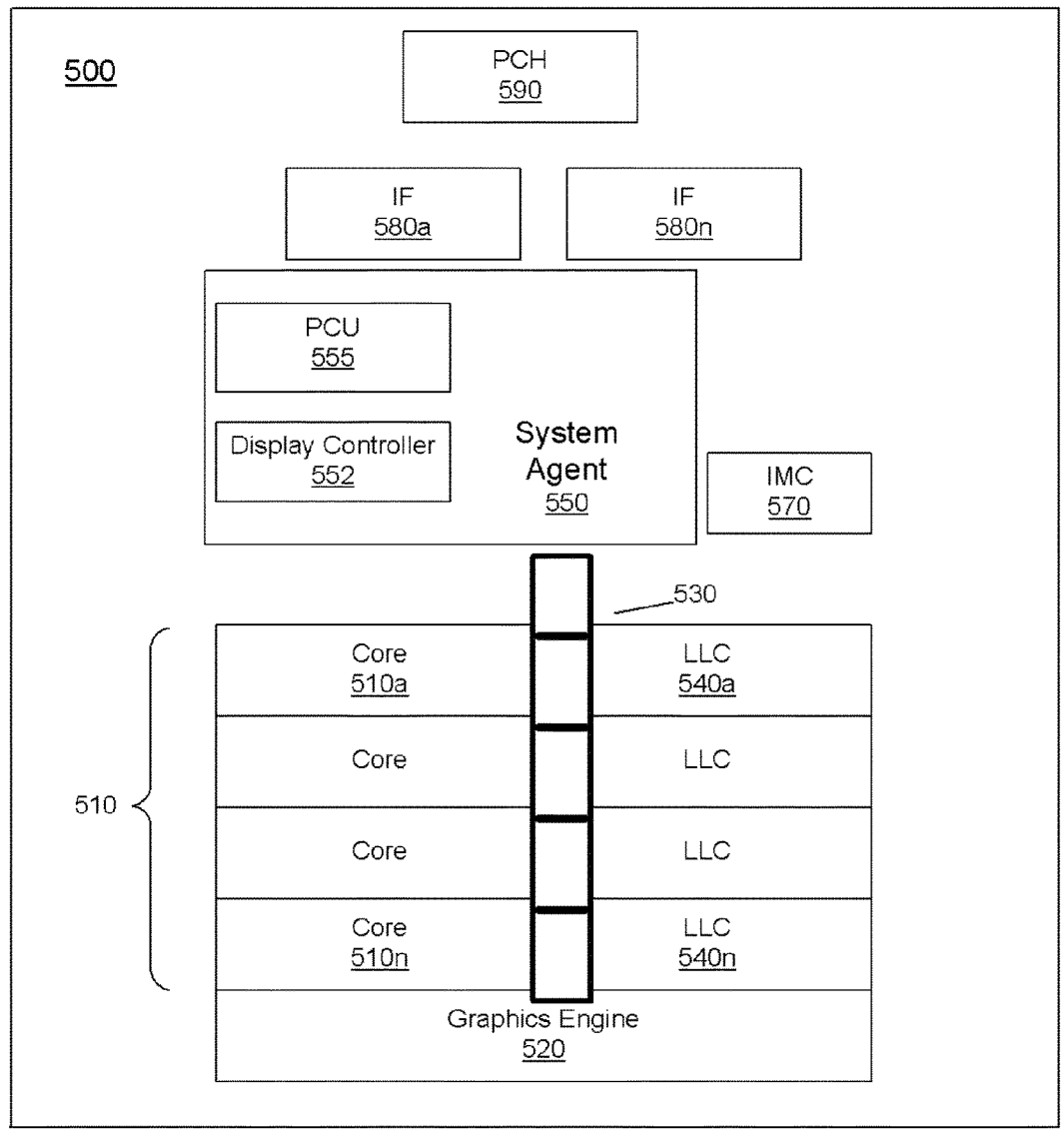
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry.

As seen, a ring interconnect 530 thus couples the cores together, and provides interconnection between the cores, graphics domain 520 and system agent circuitry 550. In some embodiments, the ring interconnect 530 may be a multiplexor or crossbar device. In the embodiment of FIG. 5, system agent domain 550 may include display controller 552 which may provide control of and an interface to an associated display. As further seen, system agent domain 550 may also include a power control unit 555 to allocate power to the core and non-core domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Although not shown for ease of illustration in FIG. 5, in some embodiments, the processor 500 may include some or all of the functionality of the fuzzy TEC controller 120 and/or the TEC device 130 described above with reference to FIGS. 1A-1B.

Figure 6:
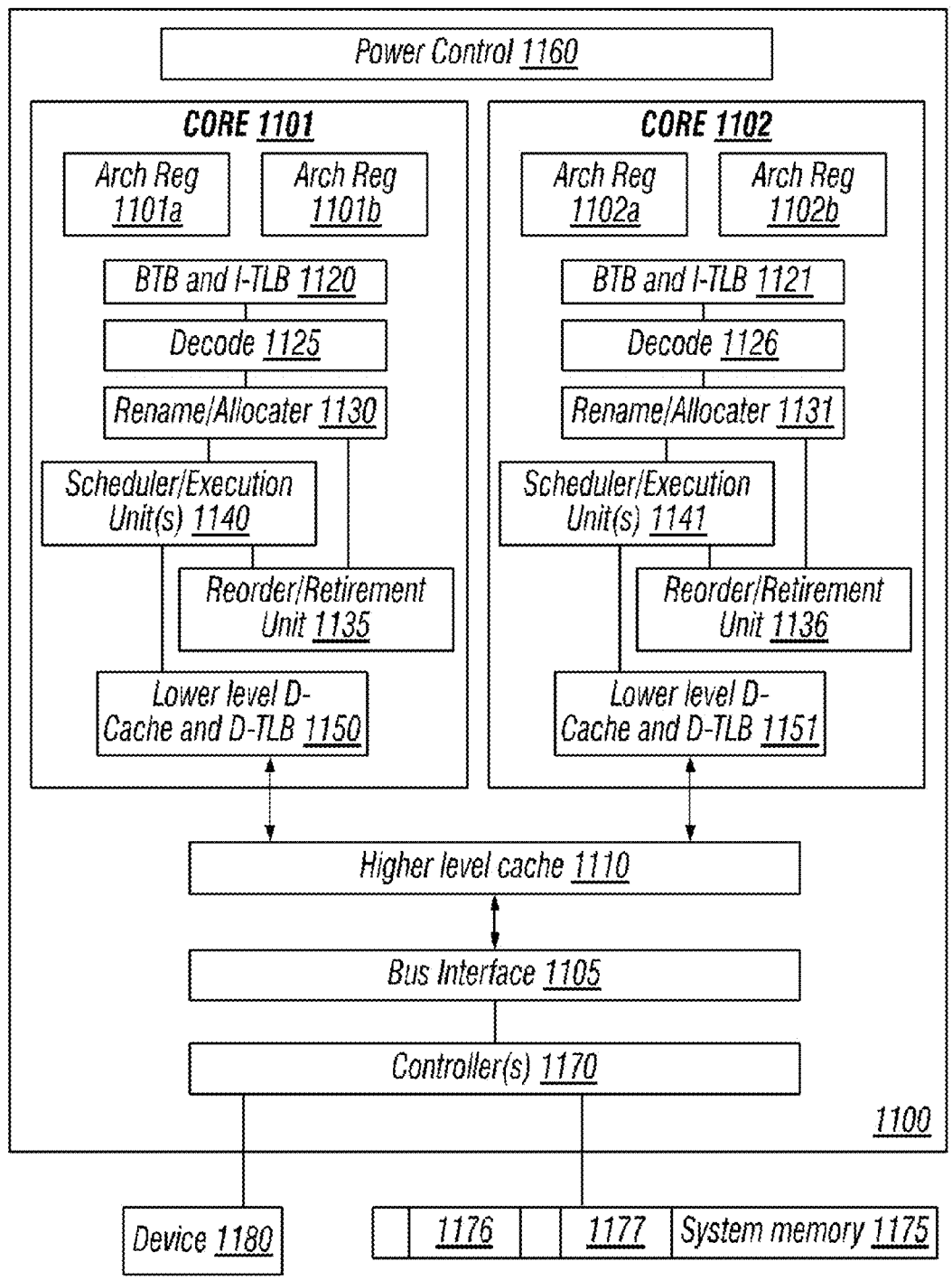
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces. In the depicted configuration, processor 1100 also includes bus interface module 1105 and a power controller 1160, which may perform power management in accordance with an embodiment of the present invention.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Although not shown for ease of illustration in FIG. 6, in some embodiments, the processor 1100 may include some or all of the functionality of the fuzzy TEC controller 120 and/or the TEC device 130 described above with reference to FIGS. 1A-1B.

Figure 7:
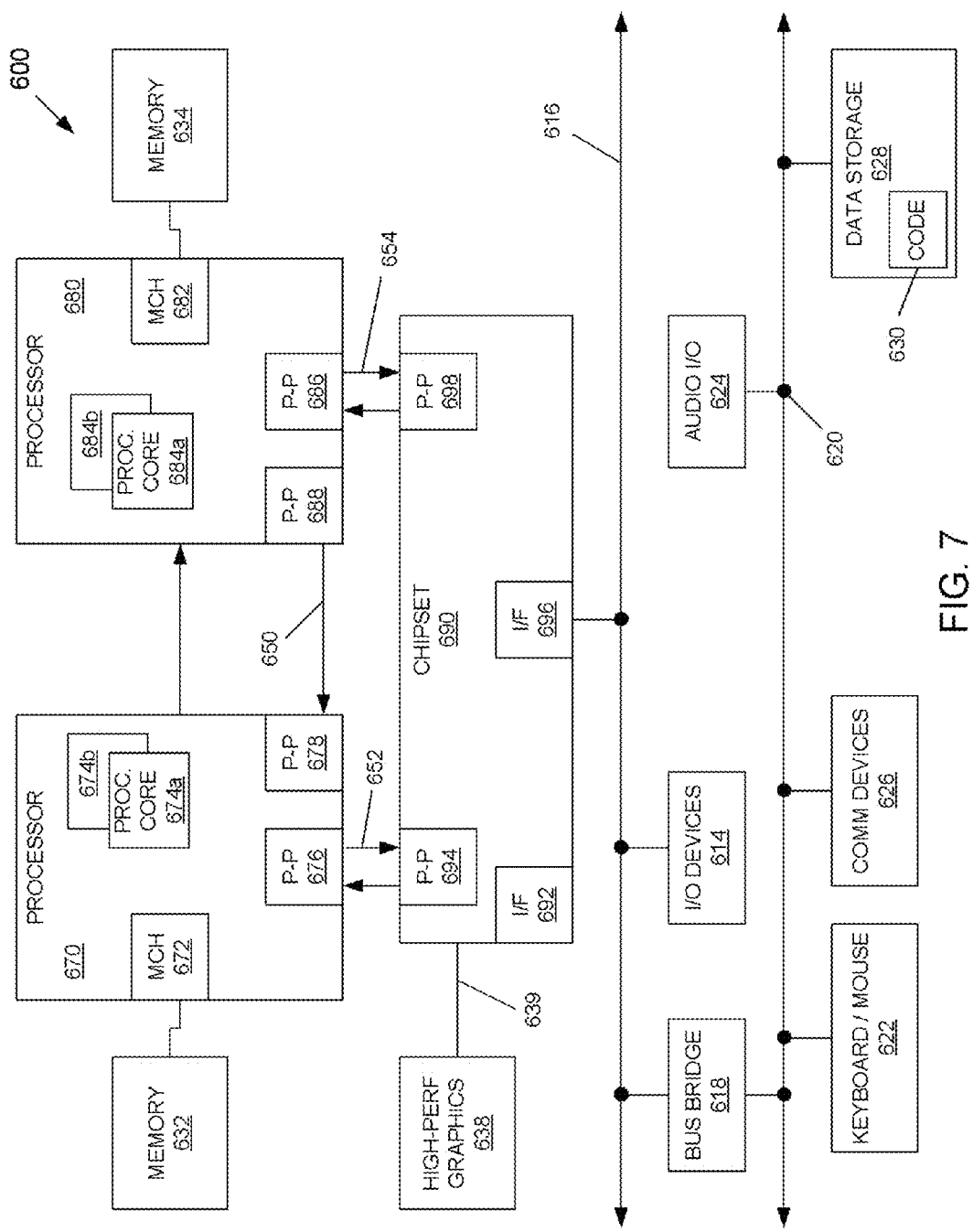
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Although not shown for ease of illustration in FIG. 7, in some embodiments, any portion of the multiprocessor system 600 may include some or all of the functionality of the fuzzy TEC controller 120 and/or the TEC device 130 described above with reference to FIGS. 1A-1B.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
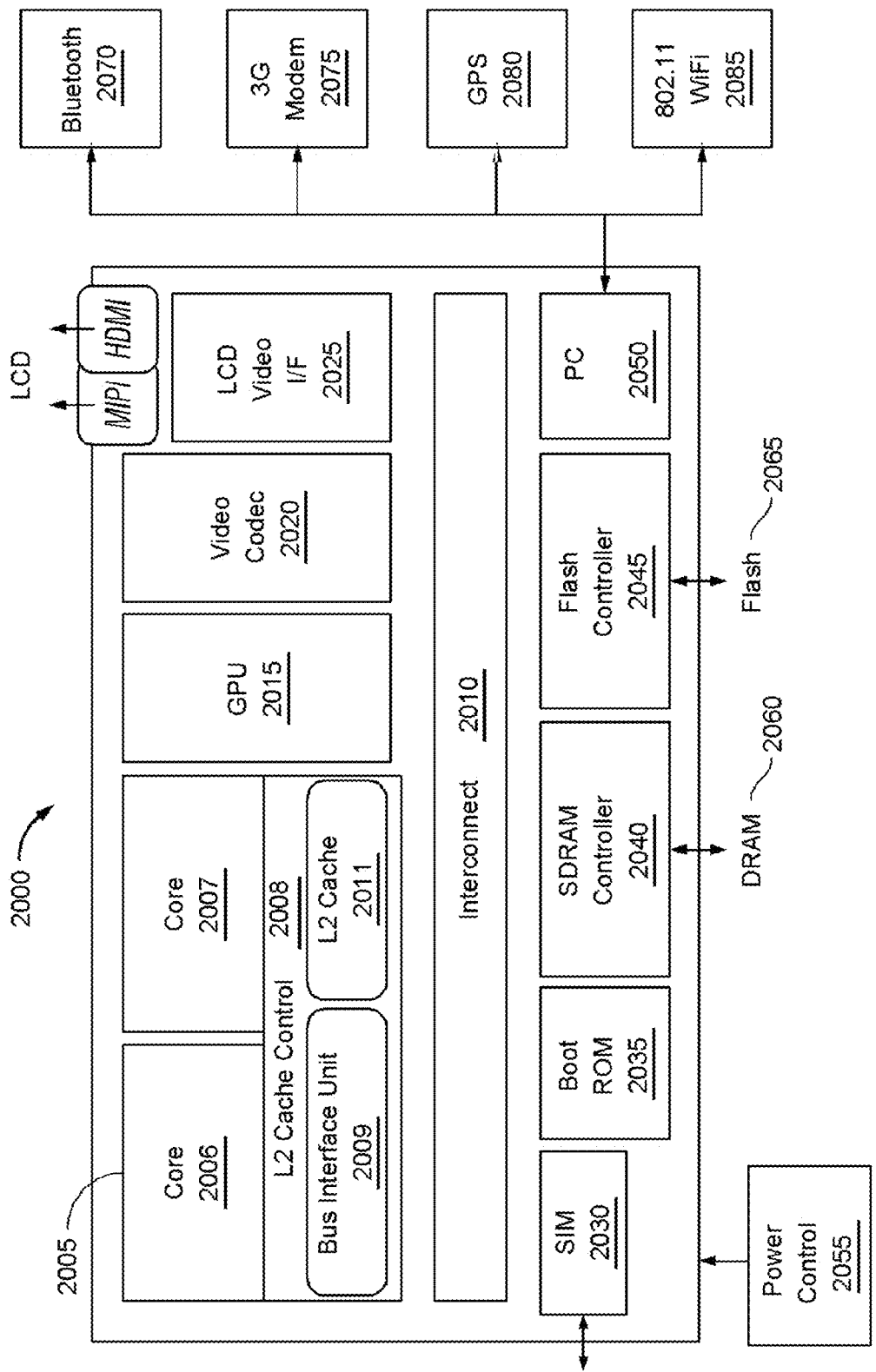
FIG. 8 is a block diagram of a system on a chip in accordance with an embodiment of the present invention.

Turning next to FIG. 8, an example of a system on-chip (SOC) design in accordance with some embodiments is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In some embodiments, SOC 2000 may include some or all of the functionality of the fuzzy TEC controller 120 and/or the TEC device 130 described above with reference to FIGS. 1A-1B.

Here, SOC 2000 includes 2 cores—2006 and 2007. The cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000.

Interconnect 2010 includes an on-chip interconnect, such as an IOSF, AMBA, or any other interconnect, which potentially implements one or more aspects of the described invention.

Interface 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral control Q1650 (e.g. Serial Peripheral Interface) to interface with peripherals, video codecs 2020 and Video interface 2025 to display and receive input (e.g. touch enabled input), GPU 2015 to perform graphics related computations, etc.

In addition, the system illustrates peripherals for communication, such as a Bluetooth module 2070, 3G modem 2075, GPS 2085, and WiFi 2085. Note that a UE includes a radio for communication. As a result, these peripheral communication modules are not all required. However, in a UE some form a radio for external communication is to be included.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor including a fuzzy thermoelectric cooling (TEC) controller. The fuzzy TEC controller may be to: obtain a current TEC level associated with the processor; obtain a current fan power level associated with the processor; fuzzify the current TEC level to obtain a first fuzzy fan level; fuzzify the current fan power level to obtain a second fuzzy fan level; determine a new TEC power level based at least in part on the first fuzzy fan level, the second fuzzy fan level, and a plurality of fuzzy rules; and provide the new TEC power level to a TEC device associated with the processor, wherein the TEC device is to transfer heat from the processor to a heat sink.

In an example, the fuzzy TEC controller is further to calculate a new fan power level based at least in part on the first fuzzy fan level, the second fuzzy fan level, and the plurality of fuzzy rules.

In an example, the fuzzy TEC controller is further to provide the new fan power level to least one cooling fan providing an air flow to the heat sink.

In an example, the fuzzy TEC controller is further to obtain a current temperature associated with the processor. In an example, the fuzzy TEC controller is further to determine the new TEC power level using the current temperature.

In an example, the fuzzy TEC controller is further to: evaluate, using at least the first fuzzy fan level and the second fuzzy fan level, the plurality of fuzzy rules to obtain a plurality of fuzzy outputs; and perform a fuzzy inference using the plurality of fuzzy outputs. In an example, the fuzzy TEC controller is further to de-fuzzify each of the plurality of fuzzy outputs to obtain quantities.

In an example, the fuzzy TEC controller is to determine the new TEC power level based at least in part on reducing a cost factor associated with each of the plurality of fuzzy rules. In an example, the cost factor associated with each of the plurality of fuzzy rules may be based at least in part on an amount of power consumed by a fan and an amount of power consumed by the TEC device. In an example, the cost factor associated with each of the plurality of fuzzy rules is further based at least in part on an amount of power associated with heat leakage in the TEC device.

In an example, the fuzzy TEC controller is to determine the new TEC power level based at least in part on reducing a prediction error associated with each of the plurality of fuzzy rules.

In another example embodiment may be a system including a processor, a fuzzy thermoelectric cooling (TEC) controller, a heat sink, at least one TEC device, and a dynamic random access memory (DRAM) coupled to the processor. The processor may include at least one core to execute instructions. The fuzzy TEC controller may be to: fuzzify a current TEC level to obtain a first fuzzy fan level; fuzzify a current fan power level to obtain a second fuzzy fan level; evaluate, using at least the first fuzzy fan level and the second fuzzy fan level, a plurality of fuzzy rules to obtain a plurality of fuzzy outputs; determine a new TEC power level based at least in part on the plurality of fuzzy outputs. The at least one TEC device may be to transfer heat from the processor to the heat sink based on the new TEC power level.

In an example, the system may further include at least one fan providing an air flow to the heat sink.

In an example, the fuzzy TEC controller may include a parameter tuner to evaluate a cost factor associated with each of the plurality of fuzzy rules, the cost factor based at least in part on the amount of cumulative power consumed by the at least one TEC device and the at least one fan.

In an example, the fuzzy TEC controller may include inference logic to derive a fuzzy inference based on a weighted combination of the plurality of fuzzy outputs. In an example, the fuzzy TEC controller may include de-fuzzification logic to de-fuzzify at least one output of the inference logic.

In another example embodiment may be a method to control thermoelectric cooling, the method including: converting, using a thermoelectric cooling (TEC) controller, a current TEC level to obtain a first fuzzy fan level; converting, using the TEC controller, a current fan level to obtain a second fuzzy fan level; performing a fuzzy inference based on the first fuzzy fan level and the second fuzzy fan level; and determining a new TEC level based at least in part on the fuzzy inference.

In an example, the method may also include determining a new fan level based at least in part on the fuzzy inference.

In an example, the method may also include providing power to a TEC device based on the new TEC level, where the TEC device is to transfer heat from an electronic component to a heat sink.

In an example, the current fan level may correspond to a first pulse width modulated (PWM) duty cycle, and the current TEC level may correspond to a second PWM duty cycle.

In an example, performing the fuzzy inference may include evaluating a plurality of fuzzy rules. In an example, the method may also include determining a cost factor for each of the plurality of fuzzy rules. In an example, the method may also include de-fuzzifying at least one output of the plurality of fuzzy rules.

In another example embodiment may be a communication device arranged to perform the method described above.

In another example embodiment may be at least one machine readable medium comprising a plurality of instructions that in response to being executed on a computing device, cause the computing device to carry out the method described above.

In another example embodiment may be an apparatus for processing instructions, configured to perform the method described above.

In another example embodiment may be an apparatus comprising means for performing the method described above.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
    a fuzzy thermoelectric cooling (TEC) controller to:
        obtain a current TEC level associated with the processor;
        obtain a current fan power level associated with the processor;
        fuzzify the current TEC level to obtain a first fuzzy fan level;
        fuzzify the current fan power level to obtain a second fuzzy fan level;
        determine a new TEC power level based at least in part on the first fuzzy fan level, the second fuzzy fan level, and a plurality of fuzzy rules; and
        provide the new TEC power level to a TEC device associated with the processor, wherein the TEC device is to transfer heat from the processor to a heat sink.

2. The processor of claim 1, wherein the fuzzy TEC controller is further to calculate a new fan power level based at least in part on the first fuzzy fan level, the second fuzzy fan level, and the plurality of fuzzy rules.

3. The processor of claim 2, wherein the fuzzy TEC controller is further to provide the new fan power level to least one cooling fan providing an air flow to the heat sink.

4. The processor of claim 1, wherein the fuzzy TEC controller is further to obtain a current temperature associated with the processor.

5. The processor of claim 4, wherein the fuzzy TEC controller is to determine the new TEC power level using the current temperature.

6. The processor of claim 1, wherein the fuzzy TEC controller is further to:
    evaluate, using at least the first fuzzy fan level and the second fuzzy fan level, the plurality of fuzzy rules to obtain a plurality of fuzzy outputs; and
    perform a fuzzy inference using the plurality of fuzzy outputs.

7. The processor of claim 6, wherein the fuzzy TEC controller is further to de-fuzzify each of the plurality of fuzzy outputs to obtain quantities.

8. The processor of claim 1, wherein the fuzzy TEC controller is to determine the new TEC power level based at least in part on reducing a cost factor associated with each of the plurality of fuzzy rules.

9. The processor of claim 8, wherein the cost factor associated with each of the plurality of fuzzy rules is based at least in part on an amount of power consumed by a fan and an amount of power consumed by the TEC device.

10. The processor of claim 9, wherein the cost factor associated with each of the plurality of fuzzy rules is further based at least in part on an amount of power associated with heat leakage in the TEC device.

11. The processor of claim 1, wherein the fuzzy TEC controller is to determine the new TEC power level based at least in part on reducing a prediction error associated with each of the plurality of fuzzy rules.

12. A system comprising:
    a processor comprising:
        at least one core to execute instructions;
        a fuzzy thermoelectric cooling (TEC) controller to:
            fuzzify a current TEC level to obtain a first fuzzy fan level;
            fuzzify a current fan power level to obtain a second fuzzy fan level;
            evaluate, using at least the first fuzzy fan level and the second fuzzy fan level, a plurality of fuzzy rules to obtain a plurality of fuzzy outputs; and
            determine a new TEC power level based at least in part on the plurality of fuzzy outputs;
    a heat sink;
    at least one TEC device to transfer heat from the processor to the heat sink based on the new TEC power level; and
    a dynamic random access memory (DRAM) coupled to the processor.

13. The system of claim 12, further comprising:
    at least one fan providing an air flow to the heat sink.

14. The system of claim 13, the fuzzy TEC controller comprising:
    a parameter tuner to evaluate a cost factor associated with each of the plurality of fuzzy rules, the cost factor based at least in part on the amount of cumulative power consumed by the at least one TEC device and the at least one fan.

15. The system of claim 12, the fuzzy TEC controller comprising:
    inference logic to derive a fuzzy inference based on a weighted combination of the plurality of fuzzy outputs.

16. The system of claim 15, the fuzzy TEC controller comprising:
    de-fuzzification logic to de-fuzzify at least one output of the inference logic.

17. A method, comprising:
    converting, using a thermoelectric cooling (TEC) controller, a current TEC level to obtain a first fuzzy fan level;

converting, using the TEC controller, a current fan level to obtain a second fuzzy fan level;

performing a fuzzy inference based on the first fuzzy fan level and the second fuzzy fan level;

determining a new TEC level based at least in part on the fuzzy inference; and providing power to a TEC device based on the new TEC level, wherein the TEC device is to transfer heat from an electronic component to a heat sink.

18. The method of claim 17, further comprising determining a new fan level based at least in part on the fuzzy inference.

19. The method of claim 17, wherein the current fan level corresponds to a first pulse width modulated (PWM) duty cycle, and the current TEC level corresponds to a second PWM duty cycle.

* * * * *